(12) United States Patent
Vemareddy et al.

(10) Patent No.: US 11,295,432 B2
(45) Date of Patent: Apr. 5, 2022

(54) BROAD BAND PLASMA INSPECTION BASED ON A NUISANCE MAP

(71) Applicant: KLA-TENCOR CORPORATION, Milpitas, CA (US)

(72) Inventors: Kaushik Reddy Vemareddy, San Jose, CA (US); Shishir Suman, Gaya (IN); Pavan Kumar Perali, San Jose, CA (US)

(73) Assignee: KLA-TENCOR CORPORATION, Milpitas, CA (US)

( * ) Notice: Subject to any disclaimer, the term of this patent is extended or adjusted under 35 U.S.C. 154(b) by 108 days.

(21) Appl. No.: 15/969,229

(22) Filed: May 2, 2018

(65) Prior Publication Data

US 2019/0005638 A1    Jan. 3, 2019

Related U.S. Application Data

(60) Provisional application No. 62/526,916, filed on Jun. 29, 2017.

(51) Int. Cl.
*G06T 7/00* (2017.01)
*G06T 5/00* (2006.01)

(52) U.S. Cl.
CPC ............ *G06T 7/0004* (2013.01); *G06T 5/002* (2013.01); *G06T 2207/30148* (2013.01)

(58) Field of Classification Search
CPC .............. G06T 7/0004; G06T 5/002; G06T 2207/30148; H01L 22/30; H01L 22/12
See application file for complete search history.

(56) References Cited

U.S. PATENT DOCUMENTS

| | | | |
|---|---|---|---|
| 6,781,688 B2 | 8/2004 | Kren et al. | |
| 6,828,571 B1 | 12/2004 | McCord et al. | |
| 8,611,639 B2 | 12/2013 | Kulkarni et al. | |
| 9,002,497 B2 | 4/2015 | Volk et al. | |
| 9,262,821 B2 | 2/2016 | Shifrin et al. | |
| 2008/0250384 A1* | 10/2008 | Duffy | G03F 7/7065 716/55 |
| 2009/0037134 A1 | 2/2009 | Kulkarni et al. | |
| 2009/0080759 A1 | 3/2009 | Bhaskar et al. | |
| 2009/0287440 A1 | 11/2009 | Kulkarni et al. | |
| 2009/0299681 A1 | 12/2009 | Chen et al. | |
| 2011/0170091 A1* | 7/2011 | Chang | G03F 7/7065 356/237.5 |
| 2013/0188859 A1 | 7/2013 | Luo et al. | |

(Continued)

OTHER PUBLICATIONS

Bourgeat et al. "Patterned Wafer Segmentation", Proc. SPIE 5132, Sixth International Conference on Quality Control by Artificial Vision, 2003 (Year: 2003).*

(Continued)

*Primary Examiner* — Qian Yang
(74) *Attorney, Agent, or Firm* — Hodgson Russ LLP

(57) ABSTRACT

A noise map is used for defect detection. One or more measurements of intensities at one or more pixels are received and an intensity statistic is determined for each measurement. The intensity statistics are grouped into at least one region and stored with at least one alignment target. A wafer can be inspected with a wafer inspection tool using the noise map. The noise map can be used as a segmentation mask to suppress noise.

19 Claims, 4 Drawing Sheets

(56) References Cited

U.S. PATENT DOCUMENTS

2015/0221076 A1   8/2015  Gao et al.
2016/0289669 A1*  10/2016 Fan ................... B01L 3/502746

OTHER PUBLICATIONS

Maurya et al., A Study of Center Field Stripe Yield Loss Mechanism (Abstract Only), 13th International Symposium on the Physical and Failure Analysis of Integrated Circuits, Nov. 30, 2006.
ISA/KR, ISR and WO for PCT/US2018/040175, dated Nov. 16, 2018.

* cited by examiner

BROAD BAND PLASMA INSPECTION BASED ON A NUISANCE MAP

CROSS-REFERENCE TO RELATED APPLICATIONS

This application claims priority to the provisional patent application filed Jun. 29, 2017 and assigned U.S. App. No. 62/526,916, the disclosure of which is hereby incorporated by reference.

FIELD OF THE DISCLOSURE

This disclosure relates to semiconductor inspection methods, and, more particularly, to inspection sensitivity improvements.

BACKGROUND OF THE DISCLOSURE

Evolution of the semiconductor manufacturing industry is placing ever greater demands on yield management and, in particular, on metrology and inspection systems. Critical dimensions continue to shrink. Economics is driving the industry to decrease the time for achieving high-yield, high-value production. Minimizing the total time from detecting a yield problem to fixing it determines the return-on-investment for the semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to promote higher yield in the manufacturing process and, thus, higher profits. Inspection has always been an important part of fabricating semiconductor devices such as integrated circuits (ICs). However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary since even relatively small defects may cause unwanted aberrations in the semiconductor devices.

As design rules shrink, however, semiconductor manufacturing processes may be operating closer to the limitation on the performance capability of the processes. In addition, smaller defects can have an impact on the electrical parameters of the device as the design rules shrink, which drives more sensitive inspections. As design rules shrink, the population of potentially yield-relevant defects detected by inspection grows dramatically, and the population of nuisance defects detected by inspection also increases dramatically. Therefore, more defects may be detected on the wafers, and correcting the processes to eliminate all of the defects may be difficult and expensive. Determining which of the defects actually have an effect on the electrical parameters of the devices and the yield may allow process control methods to be focused on those defects while largely ignoring others. Furthermore, at smaller design rules, process-induced failures, in some cases, tend to be systematic. That is, process induced failures tend to fail at predetermined design patterns often repeated many times within the design. Elimination of spatially-systematic, electrically-relevant defects is important because eliminating such defects can have an impact on yield.

Previously, areas for inspection were selected by a semiconductor manufacturer in a manner to potentially avoid noise. Semiconductor manufacturers used operator experience or design information to assume where noise existed. However, these techniques were often inaccurate because of subjectivity.

A care area (CA) also can be used to avoid noise. FIG. 1 depicts care area setup for a full die. The boxes 301-305 are different regions (care areas) that can be used for broadband plasma (BBP) inspection. However, noise statistics used for detection with BBP inspection are not optimal and are not dynamic. In legacy inspections, BBP inspection used care areas provided by a semiconductor manufacturer or user-generated legacy care areas based on semiconductor manufacturer requirements (e.g., chiplets, SRAM, input/output (I/O)). In context-based inspection (CBI), care areas were generated based on computer-aided geometrical designs (CAGDs) received from the semiconductor manufacturer or Nano Point design care areas (NPDCAs) generated based on rules or hot spots. Noise floors were separated using different regions.

Noise behavior was assumed within each region, which is a drawback of existing techniques. Noise characteristics can be different in different parts of the dies and even within the same region, which limits sensitivity in less noisy areas.

Image subtraction between dies yields noise floor identification. Image subtraction between dies can provide noise statistics, which in turn can be used to separate higher noise regions from lower noise regions. This information can feed into another layer of care areas based on the noise floor. For example, if there are eight frames in a job, then the pixel differences describe the noise. Local statistics can be determined over a 3×3 or predetermined window on all the frames and noise statistics can be assigned. The noise statistics can be grouped to form regions.

Previous techniques have other drawbacks. First, the regions are not generated based on the noise, but are drawn based on pattern repetitiveness, region priority, pattern uniqueness, or semiconductor manufacturer inputs. Parameterized inputs compromise tool sensitivity because noise information is unknown on a priority basis. Second, generating legacy care areas or NPDCAs is a tedious process that involves semiconductor manufacturer resources and time, and is a hurdle during auto recipe setup. There is no guarantee that the generated care area will have the same noise statistics.

Therefore, new systems and methods of inspection are needed.

BRIEF SUMMARY OF THE DISCLOSURE

In a first embodiment, a system is provided. The system includes a wafer inspection tool and a processor in electronic communication with the imaging system. The wafer inspection tool includes an imaging system and a chuck configured to hold a wafer. The processor is configured to generate a noise map and send instructions to the wafer inspection tool to inspect the wafer using the noise map. The noise map is used as a segmentation mask to suppress noise. Generating the noise map includes determining an intensity statistic for each of one or more measurements of intensities at one or more pixels; grouping the intensity statistics into one or more regions; and storing the intensity statistics.

The processor may be disposed in the wafer inspection tool.

The intensity statistic may be a range of the one or more measurements of intensities. The intensity statistic also may be a variance of the one or more measurements of intensities.

The processor can be configured to correlate the noise map with design information. The processor also can be configured to correlate the noise map with care areas. The care area may be from a different layer on the wafer.

The processor can be configured to create an automatic region during a recipe setup.

The processor can be configured to apply the noise map to an alignment target on the wafer.

In a second embodiment, a method of inspecting a wafer is provided. A noise map is generated using a processor. The generating the noise map includes receiving, at the processor, one or more measurements of intensities at one or more pixels; determining an intensity statistic for each measurement; grouping the intensity statistics into one or more regions; and storing the intensity statistics. A wafer is inspected with a wafer inspection tool using the noise map whereby the noise map is used as a segmentation mask to suppress noise.

The intensity statistic may be a range of the one or more measurements of intensities. The intensity statistic also may be a variance of the one or more measurements of intensities.

An operator can select the one or more regions.

The noise map can be correlated with design information. The noise map also can be correlated with care areas. The care area may be from a different layer on the wafer.

An automatic region can be created during a recipe setup.

The noise map can be applied to an alignment target on the wafer.

The noise map may be for a single die. In an instance, the inspecting is die-to-die inspection.

A computer program product comprising a non-transitory computer readable storage medium having a computer readable program embodied therewith can be provided. The computer readable program can be configured to carry out the generating step of any of the variations of the method embodiment disclosed herein.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein can improve inspection sensitivity by including noise maps in defect detection. These noise maps can be generated to improve inspection sensitivity because noisy pixels can be separated out. To make inspection recipe setup easier, the embodiments disclosed herein may include a more sensitive recipe-based inspection.

A noise map can represent a statistical property as a function of die position or wafer position. Noise maps can be generated based on spatial variation across dies statistics to create segmentation maps. The noise maps can be applied with saved align targets to improve the sensitivity. Automatic regions can be created during recipe setup and capabilities can be tuned with legacy inspections. Noise statistics can be used as attributes for post-filtering and binning.

Figure 3:
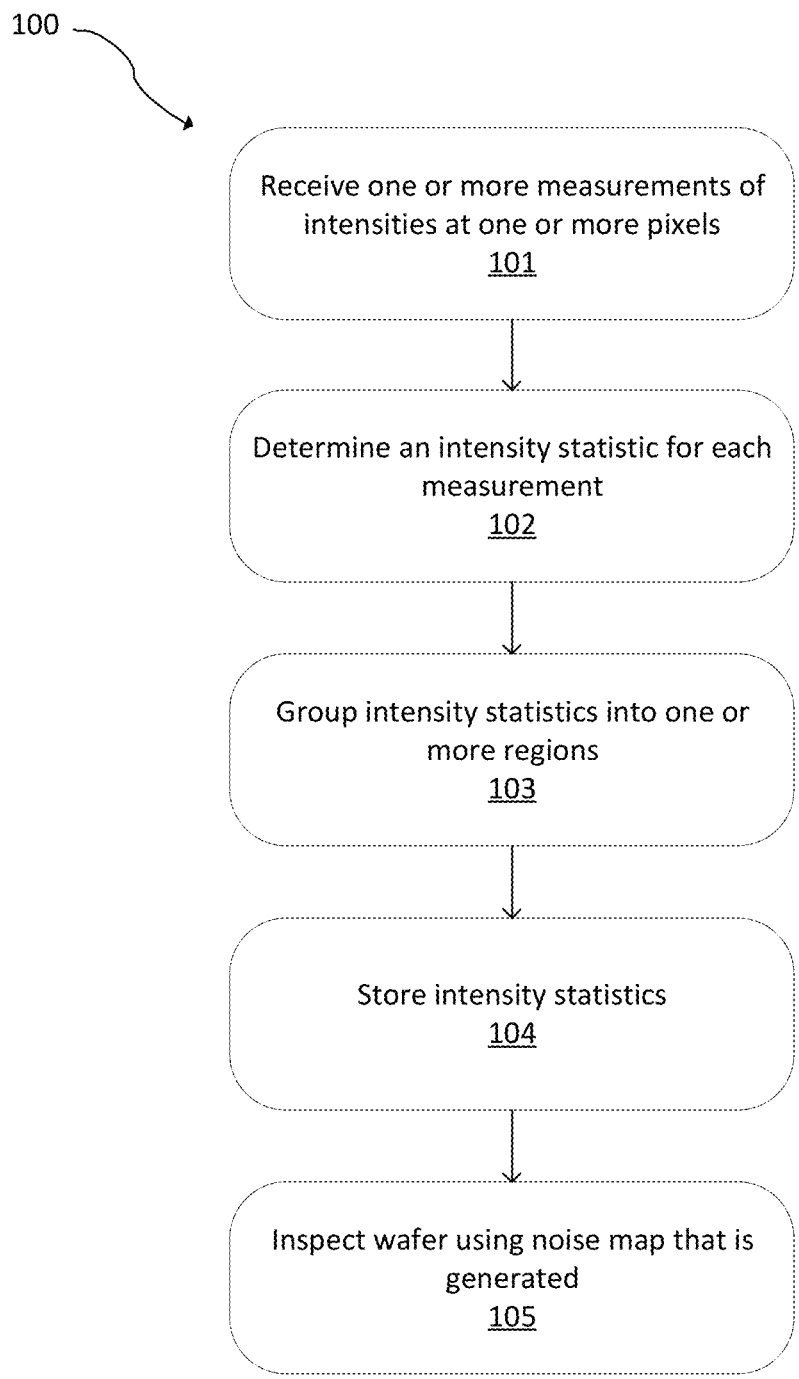
FIG. 3 is a flowchart of an embodiment of a method in accordance with the present disclosure.

FIG. 3 is a flowchart of an embodiment of a method 100 for inspecting a wafer. A noise map is generated using a processor by the steps 101-104. At 101, one or more measurements of intensities at one or more pixels are received at a processor. The measurements can include standard deviation and a range of intensities across several dies. The measurements may have or may be based on a spatial window of 3×3.

An intensity statistic for each measurement is determined at 102. The intensity statistic may be a range or a variance of the one or more measurements of intensities, such as across a spatial window of pixels (e.g., a 3×3 window). For example, the noise maps can be generated as a local variance. The range or a variation of the intensities can be determined at a pixel. The intensity statistic also can be the multi-die auto threshold (MDAT) noise of all pixels with the same intensity.

Intensity statistics are grouped into one or more regions at 103. In an instance, an operator selects the one or more regions. In an instance, the operator can set a noise domain that breaks the noise map into regions. In another instance, a histogram is used to find clumps of noisy pixels to generate the regions. This can be performed by an operator or using an algorithm. For example, a multi-Gaussian algorithm can be used to find clumps of noisy pixels. In another instance, a clustering algorithm is used to group pixels with similar statistics.

In another instance, regions can be found in care areas based on noise.

Intensity statistics are stored at 104 independent of one or more alignment targets. Alignment targets can be used to align the intensity statistics from a setup die to a runtime die and across a wafer.

Intensity statistics also can be stored at 104 with one or more alignment targets. For example, the intensity statistics may be saved with the alignment target or targets. Thus, the noise map may be applied to an alignment target on the wafer.

At 105, a wafer is inspected with a wafer inspection tool using the noise map generated by 101-104. The noise map can be used as a segmentation mask to suppress noise. In an example, different care areas are generated using the noise map and algorithms can be applied to each care area separately, which will segregate higher noise regions from lower noise regions.

In a particular example, two dies are subtracted and a noise map is generated.

The noise map can be correlated with care areas. The care areas can be from the same layer or a different layer on the wafer.

The noise map can be correlated with design information. Combining the noise map with design information can provide a more robust correlation of patterns and noise behavior, ultimately grouping them into different regions. For example, design information can help separate the nuisance defects on top of the noise maps. Noise maps can help detect outliers. Design information can separate the nuisance defects based the design context.

Existing legacy care areas or NPDCAs can be added at different layers or priorities in the recipe along with the regions generated by noise map. This information can be added using overlay. For example, legacy care area or NPDCA can be used to guide the creation of noise maps. These may form super regions before the pixels are grouped for clustering. Only pixels belonging to same legacy care area may be grouped together.

Additionally, noise maps in MDAT-based detection can be used as reference axes.

An automatic region can be created during recipe setup, which can decrease time to results. Noise map regions can serve as automatic regions. For example, the noise maps can serve as automatic regions and ease the recipe setup process in a research environment when a semiconductor manufacturer does not have much information about wafer noise conditions.

In an instance, the noise map is for a single die and the inspection of the wafer is die-to-die inspection. Thus, the noise map can be used with multiple dies on a wafer or wafers.

In an embodiment, noise maps are generated as die-to-die intensity variation.

In an embodiment, noise maps are generated by performing a fixed scan with a threshold of zero. The difference value pixels can be grouped based on the value range.

While disclosed with respect to inspection, embodiments of this method can be applied to different noise characteristics or to pre-processing steps.

Figure 1:
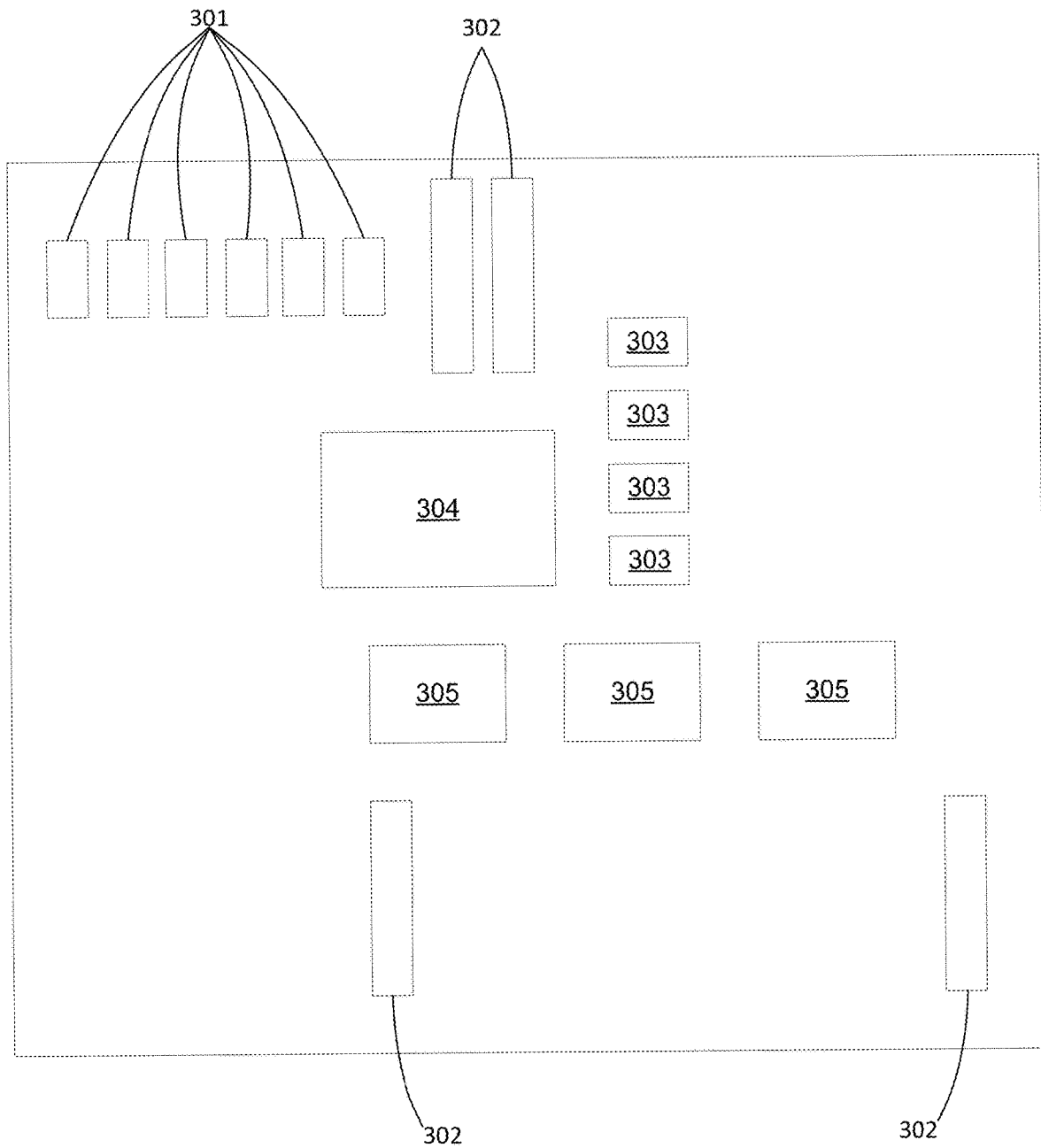
FIG. 1 depicts traditional care area setup.
Figure 2:
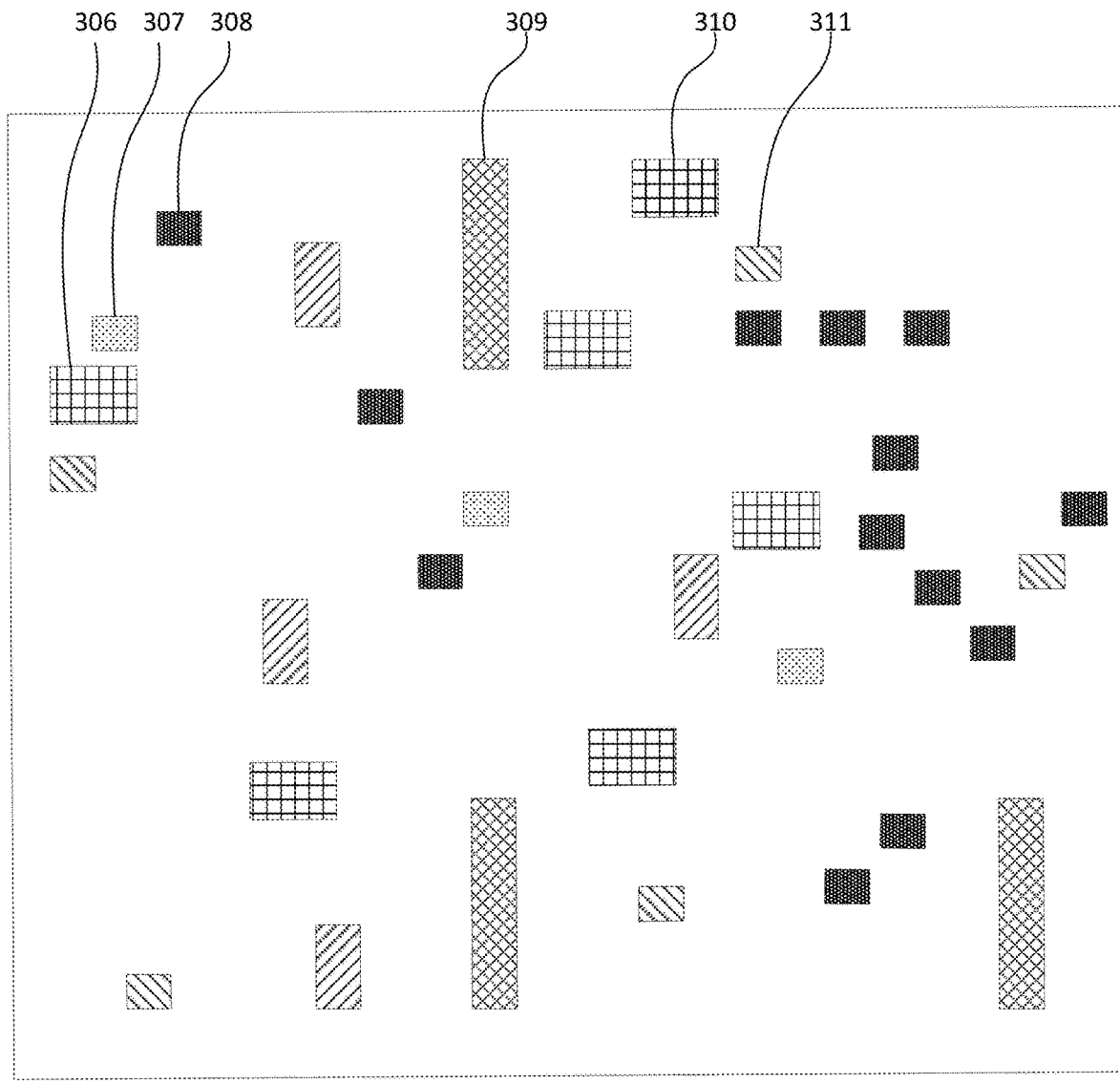
FIG. 2 depicts noise maps segmented to create regions, wherein each box indicates a segment on the noise map.

FIG. 2 depicts noise maps segmented to create regions. Each box 306-311 is a region in the noise map generated using the method of FIG. 3. Each box 306-311 may be a different region, such as logic, SRAM, I/O, etc. Each of the regions 306-311 may be optimized independently and can have different threshold parameters. In the example of FIG. 2, the noise map is of a median/mean difference image of eight dies. Each of the regions 306-311 are formed based on the noise map. The regions may be a focus of the inspection or skipped during the inspection. For example, inspection of the regions shown in the boxes 306-311 in FIG. 2 may avoid noisy areas.

Previous care area techniques were based on assumptions that noise will be different in SRAM, I/O, logic etc. Embodiments disclosed herein can calculate the noise on the wafer and then segregate them. Alignment targets may be used for better accuracy of the care areas generated based on the segregated noise, which improves detection.

In an embodiment, the difference value pixels are grouped based on ranges. For example, the difference value pixels are grouped from into ranges to generate regions based on the noise map.

In another example, eight dies are used do generate the noise map. More or fewer dies can be used to generate the noise map. For example, between one and ten dies can be used to generate the noise map.

Embodiments of this method can coexist with programmed defect arrays (PDAs) or standard reference dies (SRDs) to enable alignment of the noise maps and use them for segmentation within a region.

Embodiments of the method 100 have at least two advantages for broad band plasma (BBP) inspection or other types of semiconductor wafer inspection. First, the method 100 improves the sensitivity using region-based multi-thresholding. Different areas within the dies are grouped together and inspected according to their noise levels, offering better placement of thresholds, reducing noise rate, and improving defect detection. This can improve sensitivity of the tool by running lower noise regions much hotter and by separating effects of the higher noise region or regions from the lower noise region or regions. It also can improve learning the process variation on the wafer and prepare the detection algorithm for setting the thresholds. Thus, the defects buried the noise may be detected more easily.

Second, the method 100 can be added to the existing Pixel Point or SRD capabilities, which can target defect location. Pixel point can use semiconductor designs for care areas. The method 100 can improve the sensitivity of these capabilities by adding noise map based regions to those inspection types.

Furthermore, embodiments of the method 100 effectively use noise maps during inspection to create segments and suppress noise. This can achieve the sensitivity of Nano Point inspection with greater efficiency. The method 100 can be used in conjunction with SRD for extreme ultraviolet lithography (EUV) Print Check Qualification to run the recipes hotter. Additionally, the noise maps can be updated periodically and cope with the process variations.

Figure 4:
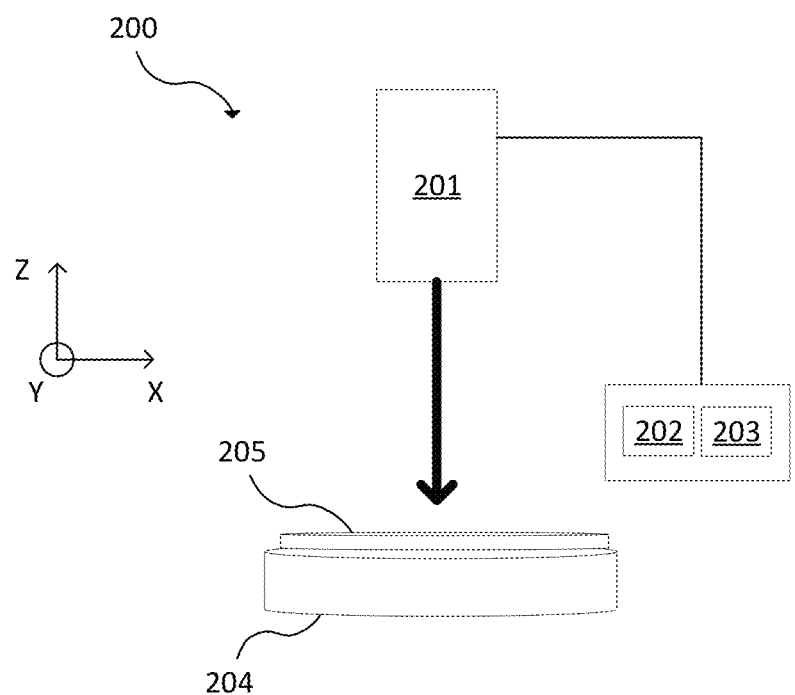
FIG. 4 is a block diagram of a system in accordance with the present disclosure.

FIG. 4 is a block diagram of an embodiment of a wafer inspection tool 200. The wafer inspection tool 200 includes a chuck 204 configured to hold a wafer 205 or other workpiece. The chuck 204 may be configured to move or rotate in one, two, or three axes. The chuck 204 also may be configured to spin, such as around the Z-axis.

The wafer inspection tool 200 also includes an imaging system 201 configured to image or measure a surface of the wafer 205. The imaging system 201 may produce a beam of light, a beam of electrons, BBP, or may use other techniques to measure a surface of the wafer 205. In one example, the imaging system 201 includes a laser. In another example, the wafer inspection tool 200 is a BBP inspection tool. The imaging system 201 can provide images of dies on the wafer 205 or can provide information used to form images of dies on the wafer 205.

The wafer inspection tool 200, including the imaging system 201, communicates with a processor 202 and an electronic data storage unit 203 in electronic communication with the processor 202. The processor 202 may include a microprocessor, a microcontroller, or other devices. A wafer inspection tool 200, which may be an SEM or BBP tool, can generate information used by the processor 202. The processor 202 and/or the electronic data storage unit 203 optionally may be in electronic communication with a wafer metrology tool or wafer review tool (not illustrated) to receive additional information.

The processor 202 and electronic data storage unit 203 may be part of the wafer inspection tool 200 or another device. In an example, the processor 202 and electronic data storage unit 203 may be part of a standalone control unit or in a centralized quality control unit. Multiple processors 202 or electronic data storage unit 203 may be used.

The processor 202 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 202 to implement various methods and functions may be stored in readable storage media, such as a memory in the electronic data storage unit 203 or other memory.

The processor 202 may be coupled to the components of the wafer inspection tool 200 in any suitable manner (e.g., via one or more transmission media, which may include wired and/or wireless transmission media) such that the processor 202 can receive output. The processor 202 may be configured to perform a number of functions using the output.

The processor 202, other system(s), or other subsystem(s) described herein may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high speed processing and software, either as a standalone or a networked tool.

If the system includes more than one subsystem, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 202 may be configured to perform a number of functions using the output of the imaging system 201 or other output. For instance, the processor 202 may be configured to send instructions to perform an inspection of the wafer 205. In another example, the processor 202 may be configured to send the output to an electronic data storage unit 203 or another storage medium. The processor 202 may be further configured as described herein.

The processor 202 may be part of a defect review system, an inspection system, a metrology system, or some other type of system. Thus, the embodiments disclosed herein describe some configurations that can be tailored in a number of manners for systems having different capabilities that are more or less suitable for different applications.

The processor 202 may be configured according to any of the embodiments described herein. The processor 202 also may be configured to perform other functions or additional steps using the output of the imaging system 201 or using images or data from other sources.

In another embodiment, the processor 202 may be communicatively coupled to any of the various components or sub-systems of wafer inspection tool 200 in any manner known in the art. Moreover, the processor 202 may be configured to receive and/or acquire data or information from other systems (e.g., inspection results from an inspection system such as a review tool, a remote database including design data and the like) by a transmission medium that may include wired and/or wireless portions. In this manner, the transmission medium may serve as a data link between the processor 202 and other subsystems of the wafer inspection tool 200 or systems external to wafer inspection tool 200.

In some embodiments, various steps, functions, and/or operations of wafer inspection tool 200 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor 202 (or computer system) or, alternatively, multiple processors 202 (or multiple computer systems). Moreover, different sub-systems of the wafer inspection tool 200 may include one or more computing or logic systems. Therefore, the above description should not be interpreted as a limitation on the present disclosure but merely an illustration.

In an embodiment, the processor 202 is configured to generate a noise map and send instructions to the wafer inspection tool 200 to inspect the wafer 205 using the noise map. The noise map is used as a segmentation mask to suppress noise. Generating the noise map includes determining an intensity statistic for each of one or more measurements of intensities at one or more pixels; grouping the intensity statistics into one or more regions; and storing the intensity statistics along with one or more alignment targets.

In an embodiment, the processor 202 may be disposed in or be part of the wafer inspection tool 200.

The intensity statistic can be a range or variance of the one or more measurements of intensities.

The processor 202 can be configured to perform additional functions. The processor 202 can be configured to correlate the noise map with design information or care areas, such as a care area from a different layer on the wafer 205. The processor 202 can be further configured to create an automatic region during recipe setup. The processor 202 may be further configured to apply the noise map to an alignment target on the wafer 205.

An additional embodiment relates to a non-transitory computer-readable medium storing program instructions executable on a processor for inspecting a wafer, as disclosed herein. In particular, a processor, such as the processor 202, can be coupled to a memory in an electronic data storage medium, such as the electronic data storage unit 203, with non-transitory computer-readable medium that includes executable program instructions. The computer-implemented method may include any step(s) of any method(s) described herein. For example, processor 202 may be programmed to perform some or all of the steps of FIG. 3. The memory in the electronic data storage medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

Each of the steps of the method may be performed as described herein. The methods also may include any other step(s) that can be performed by the processor and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
   a wafer inspection tool including:
      an imaging system; and
      a chuck configured to hold a wafer; and
   a processor in electronic communication with the imaging system, wherein the processor is configured to generate a noise map that represents intensity statistics as a function of position, and wherein generating the noise map includes:
      determining the intensity statistics for each of one or more measurements of intensities at one or more pixels;
      grouping the intensity statistics into two or more regions using one of a histogram, a multi-Gaussian algorithm, or a clustering algorithm;
      evaluating a design of the wafer in the two or more regions;
      overlaying a legacy care area or a design care area with the design;
      applying at least two intensity statistic thresholds to the two or more regions, wherein the at least two intensity statistic thresholds are applied based on the design of the wafer in the two or more regions, and wherein the at least two intensity statistic thresholds differentiate between a memory region on the wafer and a logic region on the wafer; and
      storing the intensity statistics;
   wherein the processor is further configured to:
      generate care areas using the noise map, wherein the noise map is used as a segmentation mask to suppress noise when generating the care areas, and wherein the intensity statistics in two of the care areas are different;
      segregate the care areas based on a noise level and whether the intensity statistics in the care areas exceeds a respective of the intensity statistic thresholds; and
      send instructions to the wafer inspection tool to inspect the wafer using the care areas.

2. The system of claim 1, wherein the processor is disposed in the wafer inspection tool.

3. The system of claim 1, wherein the intensity statistics are a range of the one or more measurements of intensities.

4. The system of claim 1, wherein the intensity statistics are a variance of the one or more measurements of intensities.

5. The system of claim 1, wherein the processor is further configured to correlate the noise map with design information and to separate nuisance defects using the design information.

6. The system of claim 1, wherein the processor is further configured to correlate the noise map with the care areas such that only pixels belonging to one of the care areas are grouped together.

7. The system of claim 6, wherein the care area is from a different layer on the wafer.

8. The system of claim 1, wherein the processor is further configured to create an automatic region during a recipe setup.

9. The system of claim 1, wherein the processor is further configured to apply the noise map to an alignment target on the wafer.

10. A method of inspecting a wafer comprising:
   generating a noise map that represents intensity statistics as a function of position using a processor, wherein the generating the noise map includes:
      receiving, at the processor, one or more measurements of intensities at one or more pixels;
      determining the intensity statistics for each measurement;
      grouping the intensity statistics into two or more regions using one of a histogram, a multi-Gaussian algorithm, or a clustering algorithm;
      evaluating a design of the wafer in the two or more regions;
      overlaying a legacy care area or a design care area with the design;
      applying at least two intensity statistic thresholds to the two or more regions, wherein the at least two intensity statistic thresholds are applied based on the design of the wafer in the two or more regions, and wherein the at least two intensity statistic thresholds differentiate between a memory region on the wafer and a logic region on the wafer; and
      storing the intensity statistics;
   generating care areas using the noise map wherein the noise map is used as a segmentation mask to suppress noise when generating the care areas, and wherein the intensity statistics in two of the care areas are different;
   segregating the care areas based on a noise level and whether the intensity statistics in the care areas exceeds a respective of the intensity statistic thresholds; and
   inspecting the care areas of a wafer with a wafer inspection tool.

11. The method of claim 10, wherein the intensity statistics are a range of the one or more measurements of intensities.

12. The method of claim 10, wherein the intensity statistics are a variance of the one or more measurements of intensities.

13. The method of claim 10, further comprising correlating the noise map with design information and separating nuisance defects using the design information.

14. The method of claim 10, further comprising correlating the noise map with the care areas such that only pixels belonging to one of the care areas are grouped together.

15. The method of claim 14, wherein the care area is from a different layer on the wafer.

16. The method of claim 10, further comprising creating an automatic region during a recipe setup.

17. The method of claim 10, further comprising applying the noise map to an alignment target on the wafer.

18. The method of claim 10, wherein the noise map is for a single die, and wherein the inspecting is die-to-die inspection.

19. A computer program product comprising a non-transitory computer readable storage medium having a computer readable program embodied therewith, the computer readable program configured to carry out the generating the noise map step, the generating the care areas step, and the segregating step of claim 10 and sends instructions to perform the inspecting step of claim 10.

* * * * *